United States Patent
Van Buer (10) Patent No.: US 7,885,764 B2
(45) Date of Patent: Feb. 8, 2011

(54) METHOD FOR ADAPTIVELY CONSTRUCTING AND REVISING ROAD MAPS

(75) Inventor: Darrel J. Van Buer, Los Angeles, CA (US)

(73) Assignee: GM Global Technology Operations LLC, Dertroit, MI (US)

( * ) Notice: Subject to any disclaimer, the term of this patent is extended or adjusted under 35 U.S.C. 154(b) by 385 days.

(21) Appl. No.: 11/851,208

(22) Filed: Sep. 6, 2007

(65) Prior Publication Data

US 2009/0070035 A1    Mar. 12, 2009

(51) Int. Cl.
G05D 1/06 (2006.01)
(52) U.S. Cl. .................. 701/210; 701/201; 701/202; 701/207; 701/209; 701/217; 340/991; 340/993; 340/995.14; 340/990
(58) Field of Classification Search .......... 701/209, 701/117, 118, 201, 202, 207, 208, 210, 217; 340/991, 993, 998, 990, 995
See application file for complete search history.

(56) References Cited

U.S. PATENT DOCUMENTS

| | | | |
|---|---|---|---|
| 5,307,278 A * | 4/1994 | Hermans et al. | 701/217 |
| 6,098,015 A * | 8/2000 | Nimura et al. | 701/209 |
| 2003/0009277 A1 * | 1/2003 | Fan et al. | 701/117 |

FOREIGN PATENT DOCUMENTS

| | | |
|---|---|---|
| JP | 09-089579 A | 4/1997 |
| JP | 2001-241959 A | 9/2001 |
| JP | 2004-245654 A | 9/2004 |

OTHER PUBLICATIONS

Van Buer, D., U.S. Patent Application titled "Traffic Notification System for Reporting Traffic Anomalies Based on Historical Probe Vehicle Data", U.S. Appl. No. 11/372,721, filed Mar. 10, 2006.

* cited by examiner

*Primary Examiner*—Tuan C To
*Assistant Examiner*—Redhwan Mawari
(74) *Attorney, Agent, or Firm*—John A. Miller; Miller IP Group, PLC

(57) ABSTRACT

A method for constructing and revising road maps in a vehicle map database using vehicle location signals to provide traffic flow information for recognized vehicle patterns from past vehicle travel. The method includes identifying vehicle travel segments as a series of exemplar points from the location signals. Exemplar points in each travel segment are eliminated to define the travel segment by a beginning exemplar point and an ending exemplar point. A potential ending exemplar point may be redefined if an average location of the exemplar points from a line connecting the beginning point and the potential ending point is outside of a threshold distance. The travel segments are stored in a database, where each stored travel segment includes a travel time. The method compares new vehicle travel segments to the stored vehicle travel segments to identify a match, and then revise the vehicle travel time for the stored travel segments.

17 Claims, 5 Drawing Sheets

METHOD FOR ADAPTIVELY CONSTRUCTING AND REVISING ROAD MAPS

BACKGROUND OF THE INVENTION

1. Field of the Invention

This invention relates generally to a method for constructing and revising road maps and, more particularly, to a method for adaptively constructing and revising road maps in a vehicle navigation system based on vehicle location and previous vehicle travel.

2. Discussion of the Related Art

State of the art vehicles sometimes employ GPS receivers and a map database to identify the location of the vehicle and use the map database in a navigation system to allow the driver to identify his location on a roadway system, and provide directional assistance to a destination. It has been proposed in the art to use the information from previous vehicle travel in such a system to identify a projected vehicle path based on previous driving history. This information can then be used to help the driver navigate along that path, such as to provide traffic congestion locations, construction locations, etc., so as to allow the vehicle operator to know the circumstances of his travel, and possibly change his route based on those circumstances. Current methods for providing information to such systems that determine traffic congestion and the like typically rely on sensors in the road and other structures along the road to provide traffic volume, which can be downloaded by a vehicle.

U.S. patent application Ser. No. 11/372,721, titled Traffic Notification System For Reporting Traffic Anomalies Based On Historic Probe Vehicle Data, filed Mar. 10, 2006 by Van-Buer et al., discloses a system and method that employs GPS to track a vehicle path, and use vehicle speed to determine whether certain areas along the path are at normal traffic speeds and volumes based on past driving history. Therefore, by keeping a database in the vehicle itself, patterns can be developed for the same routes that the vehicle travels to identify when traffic conditions may not be normal.

SUMMARY OF THE INVENTION

In accordance with the teachings of the present invention, a method is disclosed for constructing and revising road maps in a vehicle map database using vehicle location signals to provide traffic flow information for recognized vehicle patterns from past vehicle travel. The method includes identifying vehicle travel segments as a series of exemplar points from the location signals. Exemplar points in each travel segment are eliminated to define the travel segment by a beginning exemplar point and an ending exemplar point. A potential ending exemplar point may be redefined if an average location of the exemplar points from a line connecting the beginning point and the potential ending point is outside of a threshold distance. The travel segments are stored in a database, where each stored travel segment includes a travel time. The method compares new vehicle travel segments to the stored vehicle travel segments to identify a match, and then revise the vehicle travel time for the stored travel segments. In one embodiment, the new travel segments are projected onto the stored travel segments by a perpendicular line from points on the new travel segments that are within a predetermined distance of the stored travel segments. Also, the travel segments can be separated in the database by locations where the vehicle speed is known to change, such as at signal lights.

Additional features of the present invention will become apparent from the following description and appended claims, taken in conjunction with the accompanying drawings.

BRIEF DESCRIPTION OF THE DRAWINGS

FIGS. 10($a$)-10($c$) show a flow chart diagram of a process for recognizing the locations that divide road segments based on speed, according to an embodiment of the present invention.

DETAILED DESCRIPTION OF THE EMBODIMENTS

The following discussion of the embodiments of the invention directed to a process for storing and updating a road map database based on repetitive vehicle travel using GPS signals is merely exemplarily in nature and is in no way intended to limit the invention or its applications or uses.

Figure 1:
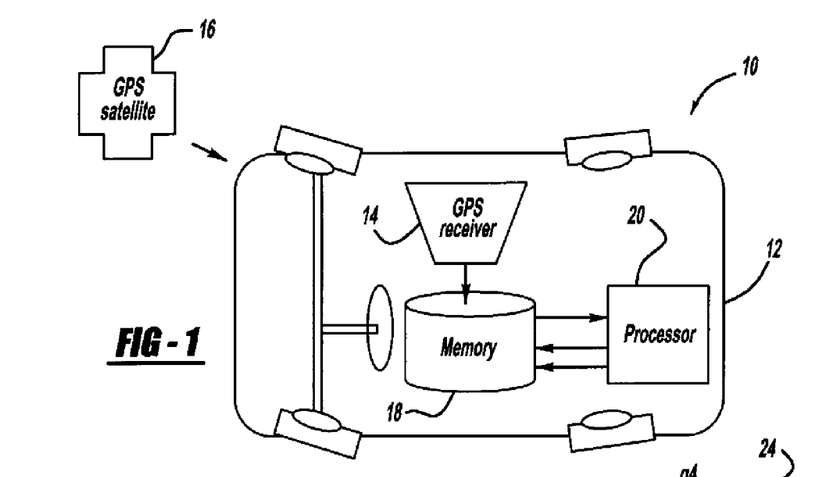
FIG. 1 is a plan view of a system for collecting and processing GPS signals in a vehicle for providing traffic flow recognition, according an embodiment of the present invention.

FIG. 1 is a block diagram of a system 10 for generating and updating a vehicle travel database using GPS signals in a vehicle 12, according to an embodiment of the present invention. The system 10 includes a GPS receiver 14 that receives GPS signals from GPS satellites 16 in a manner that is well understood to those skilled in the art. The GPS signals received by the receiver 14 are processed therein, and then stored in a memory 18. The receiver 14 can process the data and store it in the memory 18 by any suitable manner, such as a vehicle trip log, a travel condensed log, travel statistics, etc. In an alternate embodiment, the GPS receiver 14 can be replaced with any other system capable of providing precision for time, position, speed and heading at least every few seconds.

Information stored in the memory 18 is provided to a data processing device 20 that monitors a vehicle trip log using any suitable method, such as those which will be described below. The databases generated by the data processing device 20 can be stored in the memory 18 or another suitable storage location. The output of the data processing device 20 includes condensed versions of the trip log and statistical summaries covering each of many short segments of various roads and networks. The memory 18 and the processing device 20 can be located in the vehicle 12 carrying the GPS receiver 14, or alternately, at some remote central service location. When the database 18 and the processing device 20 are provided on the vehicle 12, the statistical data will summarize the travel that the vehicle 12 performs over an extended period of time, such as weeks or months. When the raw GPS data is sent to a remote service location, the data may be organized by vehicle or combined with reports from other vehicles to form statistics for some convenient group, or even all vehicles that use a particular road segment. The processing device 20 operates various algorithms according to the invention, including data collection, trip segmentation, map correlation, map creation and update, statistics, etc.

The processing device 20 provides map construction and map database refinement between data collection and correlation. The alternation between these two operations can happen in any suitable time frame such as at the completion of a trip or at some desirable intermediate frequency. While the vehicle 12 travels it collects a list of positions, ideally every second or two, however, times from 1-10 seconds have been found to be appropriate. These travel reports are then selectively discarded when a location can be adequately interpolated between points that are retained in a travel segment.

According to the invention, three basic steps are employed to find a representative set of exemplar points in the vehicle travel. The first step includes initialization that designates the initial position of a vehicle trip as an exemplar point for the trip. The beginning of a trip may be determined when the vehicle 12 is turned on, or inferred from an extended stay at a fixed position, for example, for ten minutes or more.

Figure 2:
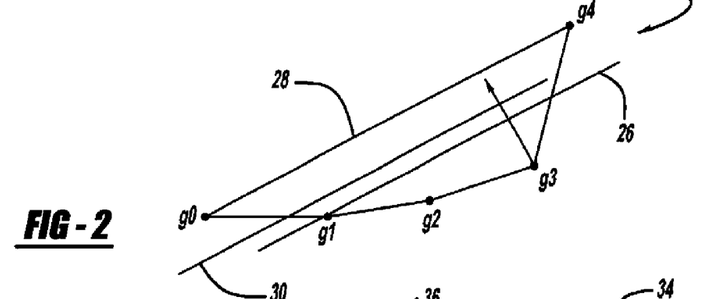
FIG. 2 is a plot showing a process for determining vehicle segment travel within a vehicle travel pattern collection system of the invention.

The second step is an extensioning process that takes the next unexamined position in travel order. FIG. 2 is a plot including points identified as g0-g4, where each point represents a GPS reading of the position of the vehicle 12. In this representation, the point g0 represents a determined starting point of the vehicle travel and g4 represents an ending point of the vehicle travel. Line 26 represents an average distance between each GPS point along the vehicle travel relative to a straight line between the end points g0 and g4 represented by line 28. Line 30 represents a maximum deviation that is acceptable between the average line 26 and the line 28 that is determined by the algorithm of the invention. In this example, the average line 26 is outside of the acceptable deviation represented by distance between the line 28 and the line 30. This calculation is performed to eliminate those GPS points that are not needed to identify the travel segment because they are close enough to the line 28 between the beginning point g0 and the ending point g4 of the travel segment. Because the average line 26 falls out of the maximum allowable deviation, the algorithm will remove the point g4 as an ending destination of the segment, and use the segment from g0 to g3 because the average distance between the points g1 and g2 for a line drawn from g0 to g3 would fall within the maximum deviation. Thus, the points g1 and g2 can be removed from the database calculation, and a travel segment between g0 and g3 will be stored.

In other words, FIG. 2 shows the intermediate computation for determining whether the point g4 can be used for a next exemplar point stored in the map database after point g0. The evaluation includes computing the area, or a reasonable approximation, between the straight line from the last exemplar point g0, and the current position g4 of the vehicle, and the segmented line that connects all of the GPS locations along the path. The algorithm divides this area by the length of the straight line 28 to derive the average separation between the two lines. The algorithm then compares the average to a threshold maximum area identified by the line 30. If the average is closer than the threshold, then the algorithm will make the current position of the vehicle 12 at location g4 as the next exemplar point, and continue on with the processing. If there are no more positions after g4, then g4 is made the final point. However, because the average line 26 is outside of the threshold, the point g4 cannot be used as the next exemplar point, so the algorithm goes back to position g3 as the next exemplar point after the position g0. The algorithm then starts with the position g3 as the next exemplar point for calculating vehicle travel segments and removing unnecessary GPS points from the database.

The combination of the threshold test with the selection of the point with the largest error filters out much of the sampling noise resulting from GPS dithering and minor road and lane drift, yet provides a good fit with a low number of exemplar points. Minimizing the number of points is motivated by the desire to limit the size of the database, and thus, the amount of memory required. Recognition of real-road construction practices favor straight roadways when practical. In addition, there is little need to note variations in the position of the vehicle 12 with lengths similar to the width of the road.

The optimum value for the error threshold is somewhat application dependent. For urban areas, it will need to be less than 100 meters to avoid confusing adjacent streets and more than 20 meters to minimize the effects of GPS errors. With a less accurate navigation system, the threshold would have to be increased to match. The typical spacing between streets and roads is also a factor in selecting a threshold. Ideally, the threshold should be less than the distance between any distinct pairs of streets that do not meet.

This processing eliminates unnecessary GPS points from the database, where travel along a straight path for an extended period of time can be represented by fewer points. Therefore, after a trip has been complete, a high percentage of the GPS readings can be discarded.

The next step in finding a representative set of exemplar points includes a correlation phase. In this phase, the segments of travel between the exemplar positions derived above are matched with a database of segments containing information about prior travel stored in the memory 18. The segment database records the position of end points and statistics of the travel time or speed on the segment in any suitable manner, such as described in the '721 application. Locating candidate segments may use any practical combination of iterative search and spatial indexing, such as quad-trees. The goal of the search is to look for segments close to and approximately parallel to the segment being added to the database. This includes testing for the same direction of travel because the travel pattern may not be symmetric due to differences in turns, traffic controls and time of day. Because of sampling variations, one or more segments in the database may match all or part of the travel being recorded and there will be some small variation in position and alignment. In a sample implementation, the segments are considered to match if they are less than 25 meters apart along with their shared extents and within 40° of the same heading. Some travel will follow a previously unobserved route, and do not match anything in the database. When no existing segment in the database matches the current travel segment, it is added to the database as a new segment.

Otherwise, for each match, the algorithm projects the end points of the candidate segment onto an infinite line passing through the end points of the segment from the database and projects the end points of the database segment onto the line passing through the end points of the candidate segment.

Figure 3:
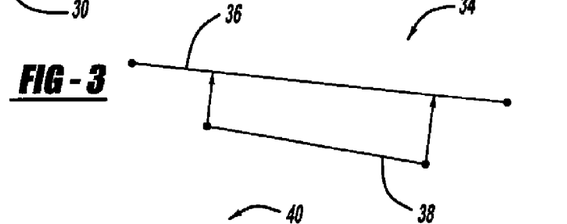
FIG. 3 is a plot showing a process for correlating a vehicle travel segment to a travel segment in a vehicle travel database.

There are three basic cases when comparing a candidate segment to a database segment. The first case is represented in FIG. 3 as plot 34 and includes a database segment 36 and a candidate segment 38, where the database segment has a length $L_d$ and the candidate segment has a length $L_c$ that is less than the length $L_d$. When the database segment 36 starts before the candidate segment 38 and extends beyond it, all of the vehicle travel time or speed from the candidate segment 38 is added to the database segment 36. The sample count is incremented by $L_c/L_d$. The algorithm computes the standard deviation using a running sum of squares, where the square of the sample value is divided by the fraction $L_c/L_d$. When one of the end points of the two segments 36 and 38 are close to each other, the position in the database is shifted toward the candidate end point by computing a weighted average position. The weight for the database position is a sample count and the new position has a weight of 1.

Any suitable process for determining whether the candidate segment 38 matches a portion of the database segment 36 can be employed within the scope of the invention. Once the candidate segment 38 has been matched to a portion of the database segment 36, the time that it takes the vehicle to travel the candidate segment 38 is used to update the overall database segment 36 based on statistical techniques, such as average time and variations in time. Therefore, each time that the database segment is traveled in whole or in part, it can be updated so that the time it takes the vehicle to travel the segment is more accurate for the next time.

Figure 4:
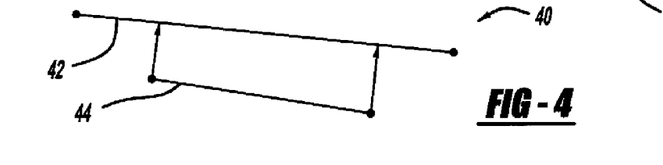
FIG. 4 is a plot showing another process for correlating a vehicle travel segment to a travel segment in a vehicle travel database.

FIG. 4 shows a plot 40 depicting the case where a candidate segment 42 starts before and extends beyond a database segment 44. When the candidate segment 42 starts before and extends beyond the database segment 44, the end points of the database segment 44 are projected onto the candidate segment 42. The candidate segment 42 is then split into three parts, particularly, a first part that is the beginning of the candidate segment to the beginning of the database segment, a second part that is the length of the database segment, and a third part that is the distance from the end of the database segment to the end of the candidate segment 42. The middle part of the candidate segment 42 is used to update the travel statistics of the database segment 44 using sample count and travel times proportional to its length compared to the whole candidate segment 42. The other two parts of the candidate segment 42 are subjected to further database searches for matching segments with proportional travel times taken from the candidate segment 42. Very short pieces of the candidate segment 42 may be discarded or treated as near matches leading to adjustment of the corresponding point in the database when it is close to the end point of the database segment 44.

Figures 5, 6, 7, 8:
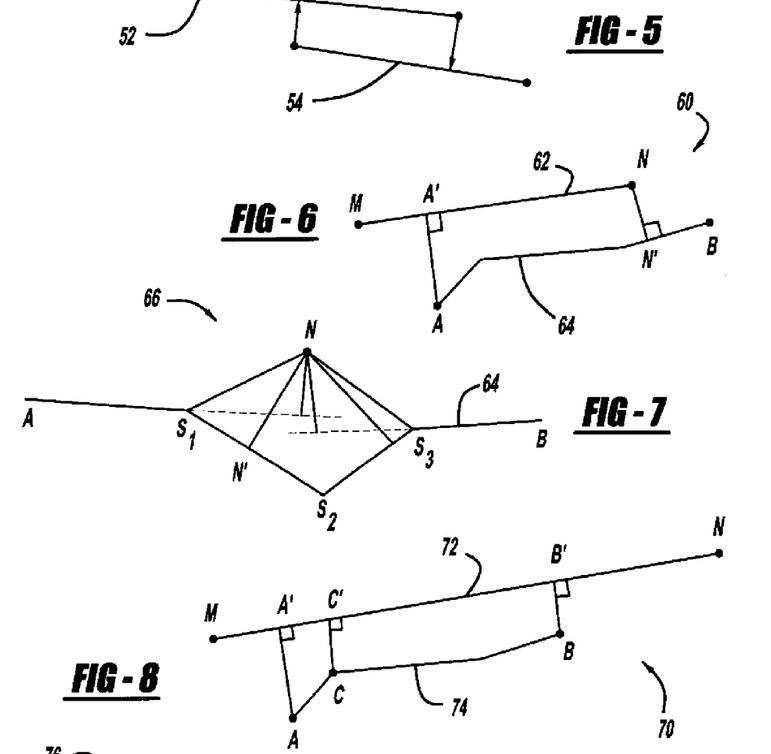
FIG. 5 is a plot showing another process for correlating a vehicle travel segment to a travel segment in a vehicle travel database.
FIG. 6 is a plot showing a process for matching a vehicle travel segment to a stored vehicle travel segment.
FIG. 7 is a plot showing a process for matching another vehicle travel segment to a stored vehicle travel segment.
FIG. 8 is a plot showing another process for matching a vehicle travel segment to a stored vehicle travel segment.

FIG. 5 is a plot 50 showing the case where there is a partial overlap between a database segment 52 and a candidate segment 54, where the first part of one segment matches the last part of the other segment. In this situation, the algorithm processes the segments 52 and 54 as a hybrid of the other two cases shown in FIGS. 3 and 4. Particularly, the part of the candidate segment 54 that does not match the database segment 52 is tested against the remainder of the database segments, and the part of the candidate segment 54 that does match the database segment 52 makes a fractional contribution to the database segment 52, such as discussed above for the plot 40.

Because the database is self-organizing, it will automatically record any private roads, as well as recently constructed or changed roads. While it may lack the semantic annotations and structure useful for mapping and guidance applications, it is well suited for collecting locations and speeds for comparison in later travel. Over time and repeated trips, the database will develop a statistical profile that captures the road conditions experienced in the vehicle 12. For the most common case, a vehicle operator who repeats a small number of trips frequently, the result is a database for detecting future problems in traffic.

The discussion above of the invention describes a general concept of building a history database containing information and statistics about prior vehicle travel, and then comparing current vehicle travel to the history database to enable detecting and reporting unusual traffic. A second part of the invention discussed below builds on this framework by providing new techniques in the way that the database is built and maintained to improve the accuracy in mapping GPS reports to the road models provided in the map and to accumulate statistics for the proper road segments.

As discussed, the map database is structured as a collection of road segments, where each road segment has to end, and where each end can be an intersection or a dead end. This is a reasonable assumption for a database designed to support applications based on connectivity in the road network, i.e., route planning and guidance. It can be further assumed that each segment may have a series of intermediate positions, referred to herein as shape points, to capture a piece wise approximation of curves and bends along the segment. It can also be assumed that this basic map structure may not be altered, but that additional information can be added. Even if the underlying database does not accept annotations, such annotations may be simulated by using each map identifier as a key in an adjunct database. This aspect of the invention is useful when a road map database is supplied in advance, such as part of an on-board navigation aid. These maps tend to have additional complexity and annotations, as well as roads never visited before in a given vehicle.

The following discussion does not depend on the nature of the end points or the presence of shape points, but is designed to accommodate them when they are present. Because the road segments can be assumed to have no important intermediate entrances and exits, the primary interest is the travel time or average speed on each segment. At a higher application level, the travel time along some end-to-end sequence of segments is of interest, but that is straight forward to estimate once the segments have been annotated with statistical summaries of travel on each segment.

The basic approach is to collect and simplify the sequence of GPS samples collected during a trip, such as discussed above with reference to FIG. 2, to provide a connected sequence of observed road segments.

Once these temporary road segments are generated, they are matched against the database road segments, such as discussed above with reference to FIGS. 3 and 4. This matching may be done as segments are identified or at the completion of a trip. In the discussion below, the phrase "two points are close" means that the distance computed between them is below a predetermined threshold. The value used depends on the accuracy and repeatability available from the GPS receiver 14, or other navigation device, and of the maps. To have a good probability that the GPS reports on travel will be correctly assigned, the threshold also needs to be less than half the distance between most parallel, but distinct roadways. For U.S. urban areas with maps prepared from raw data with accuracy in tens of meters and differential GPS data with errors typically 3 to 5, values of 25-40 meters have worked well. It is assumed that the segments in the map are directional. In the case of an underlying map that has a single segment for travel in both directions, the map can be augmented to associate two segments with one on the map. In many applications where actual travel is linked to a map, it will often be relevant that the flow of traffic is not symmetric.

To match one travel segment from a point M to a point N, with a measured travel time T and an average speed S, the algorithm searches the map database for an appropriate map segment. Any convenient search strategy may be used, but one that exploits the fact that the best or only appropriate segment will be only a short distance from the points on the segment M to N. In practice, it is common that at most one map segment will match the travel segment M to N, so the process discussed below will work adequately well, and will quit after the first successful match. However, using the best match will slightly improve matching accuracy. At the end of the matching process, some fragments of the segment M to N may be discarded as matching nothing in the database. In practice, the extent of these discarded segments will be small. This may be caused by errors or omissions in the map or by transient errors from the GPS receiver 14.

Figure 9:
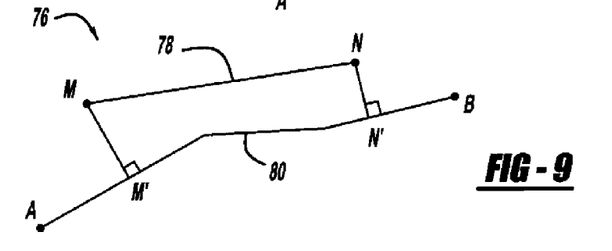
FIG. 9 is a plot showing a process for determining a closest segment point, according to an embodiment of the present invention.

FIGS. 6, 8 and 9 give examples of three main categories of useful matched segments M to N and some segments A to B in the map database. For example, FIG. 6 shows a plot 60 including a current travel segment 62 from points M to N being matched to a segment 64 from points A to B stored in the database. In the plot 60, there is a partial overlap where the segment 62 extends in one direction beyond the segment 64 and the segment 64 extends beyond the segment 62 in the other direction. In the plot 60, point A' identifies a point on the segment 62 where point A on the segment 64 is projected perpendicularly onto the segment 62. Likewise, point N' is the point on the segment 64 that point N is projected perpendicularly onto the segment 62. The algorithm computes the location of point A onto the segment 62 at point A' so that the line A-A' is perpendicular to the segment 62. Similarly, the algorithm computes the location of point N' onto the segment 64. When there are no shape points in the segment 64, this makes the line N-N' perpendicular to the segment 64 at point N'. In the case where the segment 64 is defined by additional shape points, the algorithm computes the position of point N' as the point along the segment 64 with the least distance to point N on the segment 62.

FIG. 7 is a plot 66 showing a process for determining the closest location on the segment 64 to point N on the segment 62. For each segment on the segment 64 from point A to point B, particularly $As_1$, $s_1s_2$, $s_2s_3$ and $s_3B$, the algorithm finds the projection of point N onto each of the component segments indicated by the solid lines extending from point N. For those cases where the projection of point N is on the segments $s_1s_2$ and $s_2s_3$, the algorithm computes the distance from point N to its projection. For those cases, such as segment $As_1$, where point N projects to a point on an extension of the line connecting points A and $s_1$, the algorithm computes the distance from point N to the nearest end point, particularly point $s_1$. Point N' is chosen as the point with the shortest distance among all the distances computed.

Having identified points A' and N', observations for travel from point M to point N are added to the statistics for the segment 64. If the end points of the observations always matched the end points in the statistics database, it is straight forward to add the observed value to the statistics computation and increment the sample count by one. Because these segments are often not aligned, the values must be adjusted or interpolated to account for this inaccuracy.

The statistical data being measured associated with a map database could be dependent or independent of the distances involved. Vehicle speed does not depend on the distance traveled while travel time does. For dependent quantities, the values have to be scaled when the observation for travel from point M to point N is only partially matched with a map segment. The scaling factor is the distance from point A' to point N divided by the distance from point M to point N. Because the line from point A to point N' is only a portion of the segment 64, instead of adding one to the sample count, the algorithm adds the distance from point A to point N' divided by the distance from point A to point B. In most cases, subsequent measurements will add to the statistics for the segment 64 and ultimately add one to the sample count for the statistics on the segment 64 from a single trip. Note that the conventional formulas for computing mean and standard error from a sum of values, sum of squares and sample count still work properly in computing statistics once the sample count is at least two. The segments from point M to point A' and the appropriately scaled measurements should be used in a further search of the map database.

FIG. 8 shows a plot 70 where a travel segment 72 between point M and point N is being matched to a database segment 74 between point A and point B where the travel segment 72 extends beyond both ends of the database segment 74. In this case, the algorithm projects points A' and B' onto the segment 72. The algorithm also adds statistics to the segment 74 with a sample count of one and scaled travel time from point M to point N with the distance from point A' to point B' divided by the distance from point M to point N. When the path from point A to point B includes shape points, represented here as point C, it may be the case that point A is not sufficiently close to the segment 72 to meet matching thresholds, but the path through the shape point C brings the path close enough.

Point B may similarly be too far from the segment 72. When point A is too far from the segment 72, the algorithm will try subsequent shape points in order from point A to point B, such as points $s_1$, $s_2$ and $s_3$ in FIG. 7, stopping with the first shape point that is close enough, which is point C. Point C is projected onto the segment 72 as point C'. In the case where the segment 74 is not a good fit to the segment 72, the point C might too close to the points N, B or D to be the useful amount of map segment 74 for a proper match. In this case, the algorithm skips the segment 74 and searches for other segments. When point C is introduced, the algorithm scales in measurement of the segment 72 based on point C' replacing point A' and point D' replacing point B' as appropriate to scale for the portion of the segment 72 actually matched.

FIG. 9 is a plot 76 where a travel segment 78 is shorter than a map segment 80. In this case, the algorithm maps point M onto the segment 80 as point M' and point N onto the segment 80 as point N' in the same manner as discussed above for FIG. 6. The entire measurement for the travel from point M to point N is added to the statistics for the map segment 80, but with a sample count scaled by the distance from point M to point N divided by the distance along the path from point A to point B.

The known map databases lack information about the location of signals and signs or the way that traffic actually flows on the road network. Thus, the maps alone do not provide much data on the expected variations in traffic. Combined with the limitations of the maps and the GPS signals, day-to-day variations in the flow of traffic and the state of traffic signals, i.e., green-red cycles, lead to uncertainty in the actual locations where traffic flow changes. Maps also give no information about how traffic actually behaves and which roads are busy. Because of these factors, it is necessary to learn the locations where the flow of traffic changes in speed or variability, regardless of the cause. As these locations are discovered, it also affects the best way to collect and organize the statistics that summarize traffic observations.

In order to address this limitation, the present invention also proposes creating and dynamically revising a map to provide a more accurate view of locations and stretches of roads having distinct speed profiles. The method of the invention is sufficiently independent that it may be combined with map generation and matching components that are sensitive to other aspects of the road network, for example, the location of turns.

This aspect of the invention produces more realistic traffic assessment by using inferred knowledge about variations and the flow of traffic from the effects of traffic signals and other road characteristics. This process produces road statistics organized in ways that lead to better discrimination between typical and unusual traffic along roadways and near turns and intersections. The algorithm recognizes these variations and performs the deductions. While the process does not attempt to categorize the reasons for variations in speed, it nonetheless localizes the effects. The sources of the variations are assumed to be factors, such as roadways that gain or loose a lane, busy parking lot entrances and exits, stop signs and traffic signals. By dividing map segments at locations where speed often changes markedly, each resulting segment can develop a statistical profile customized to that portion of a segment. This provides a better solution for collecting statistics between intersections on a map because this spreads even localized variability over a long distance. One common instance that is not well served without dividing segments is an arterial road segment ending at a traffic signal. Near the signal, speeds vary from zero to full speed depending on the color of the light, but traffic more than 100 meters from the light may display almost no variation under normal conditions.

Figure 10A:
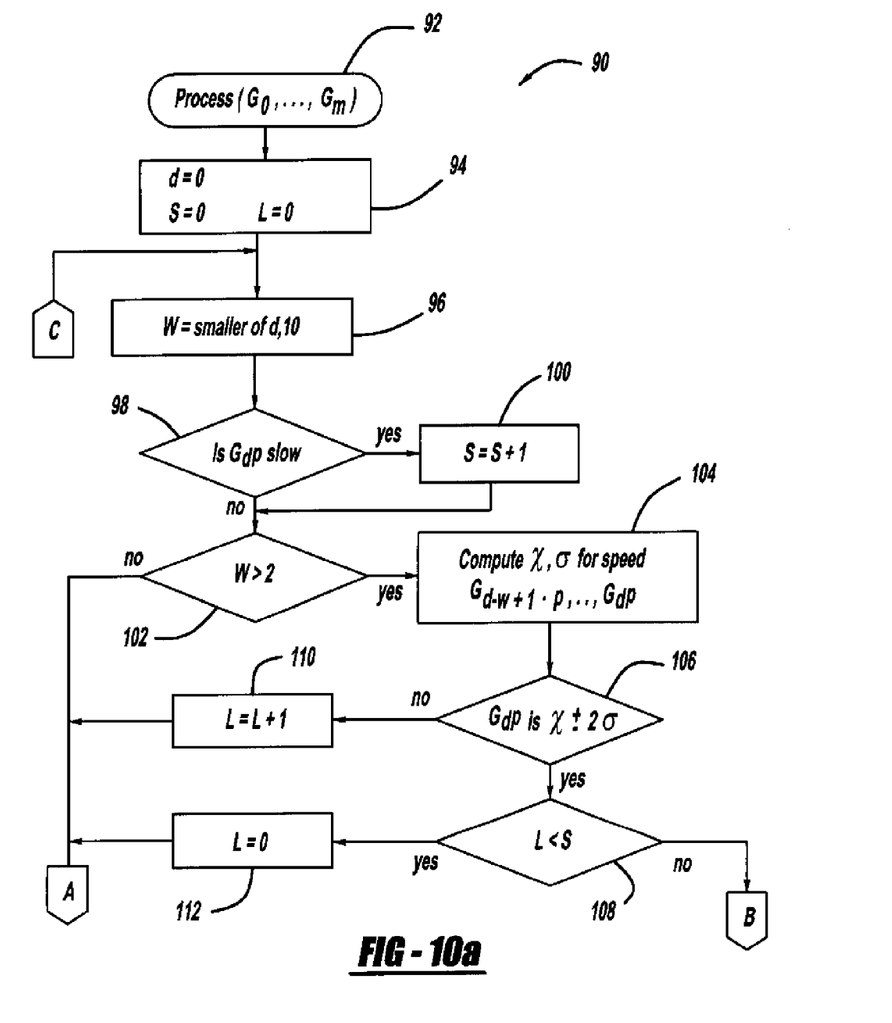
Figure 10B:
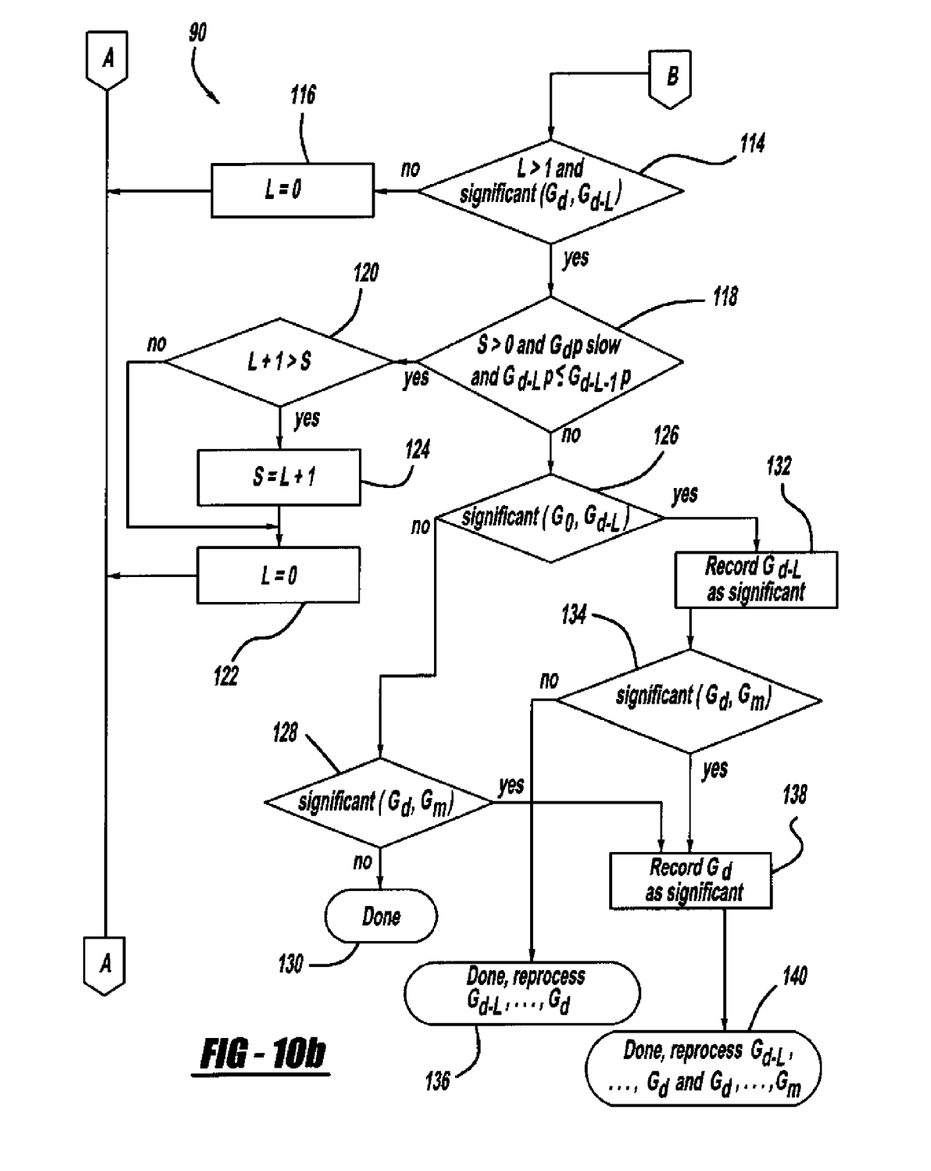
Figure 10C:
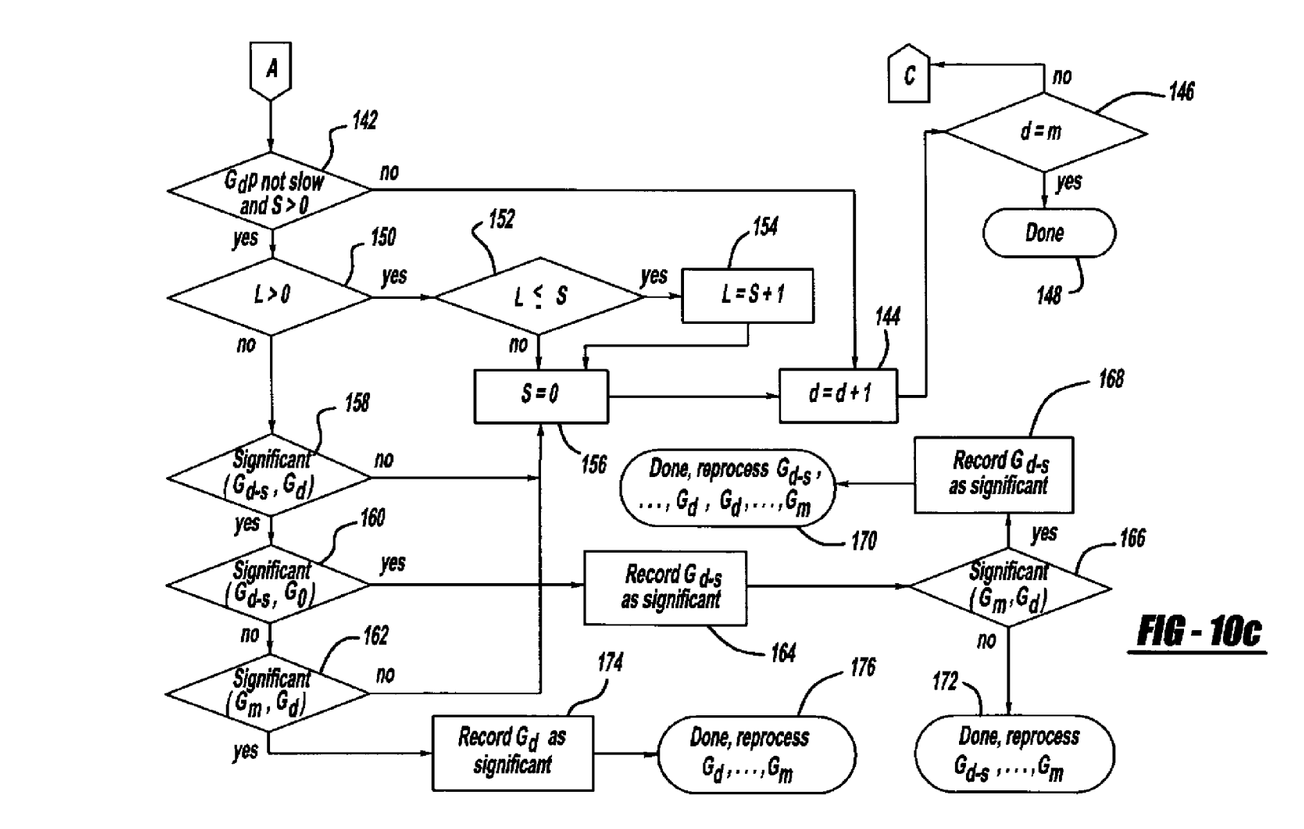

According to one embodiment of the invention, a basic approach for finding a representative set of exemplar points for representing speed changes is provided in FIGS. 10(a)-10(c) showing a flow chart diagram 90 In the flow chart 90, the values $G_0, \ldots, G_m$ at box 92 are a time ordered series of position reports from the GPS receiver 14 at regular intervals. Each report includes at least time, speed and location. The first and last points are points that have been previously identified as important in capturing the history of a trip segment, such as mapping to intersections on a map or showing an abrupt change in direction.

The algorithm is initialized at box 94 where the value d is the number of GPS samples kept for the position report $G_d$ being tested, the value S is the count of consecutive slow or stopped speeds in the GPS sample up to the current sample, and the value L is the number of consecutive anomalous speeds up to the current GPS sample. At box 96, the algorithm determines whether a value W, which is the size of the statistics window used to test for speed anomalies, is smaller than the value d and a predetermined value, such as ten. The value ten is an arbitrary value, which is not critical, but lower values may be better with long sampling intervals. The intent is to only consider fairly recent histories in looking for anomalous speeds. At the beginning of the process, fewer points are available because reports prior to the GPS sample $G_0$ are not expected to represent current travel.

The value $G_dp$ identifies how fast the vehicle 12 is traveling. At decision diamond 98, the algorithm determines whether the vehicle 12 is traveling slow, which is an arbitrarily selected speed based on testing and is a speed close to being stopped or coming to a stop. For urban automobile traffic and considering GPS uncertainty, one appropriate value for slow is 3 meters per second. Zero speed is too low because of both GPS errors and rolling stops where drivers don't come to a required full stop when traffic is favorable or the stop is brief enough to fall between GPS samples. If the algorithm determines that the vehicle speed is slow at the decision diamond 98, it adds 1 to the value S, which is 0 for the first cycle, at box 100.

The algorithm then determines whether the value W is greater than 2 at decision diamond 102 if the vehicle is not traveling slowly at the decision diamond 98 and after the value S has been incremented at the box 100. If the value W is greater than 2, meaning that there are more than two GPS samples, then the algorithm computes the mean x and standard deviation σ for the speed $G_dp$ that are currently part of the sample window at box 104. Any standard method and formula can be used to calculate the standard deviation and mean.

Once the standard deviation σ and mean x have been determined at the box 104, the algorithm determines whether the current vehicle speed $G_dp$ is within two standard deviations of the mean at decision diamond 106. If the vehicle speed is within two standard deviations of the mean at decision diamond 106, the algorithm determines whether the value L is less than the value S at decision diamond 108. If the vehicle speed is greater than two standard deviations from the mean at the decision diamond 106, then the algorithm increments the value L at box 110. Further, if the value L is less than the value S at the decision diamond 108, then the algorithm sets the value L equal to zero at box 112.

If the value L is greater than or equal to the value S at the decision diamond 108, then the algorithm determines whether the value L is greater than 1 and whether the distance between the GPS points $G_d$ and $G_{d-L}$ is significant enough at decision diamond 114. For the decision at this point, the algorithm determines whether the time and distance between GPS reports is significant enough. The threshold is set depending on testing and other criteria. The intent is to consider two points that are very close in time or space not worth separating. In one non-limiting embodiment, the test required the product of time and distance between two points to be at least 1500 meter seconds. For typical urban automobile traffic, this has been a workable threshold, such as over 100 meters in 15 seconds or over 150 meters in 10 seconds. In addition, this test on the value L ignores isolated anomalies observations, such as a brief disturbance or GPS error. If the value L is not greater than 1 or the differences between the GPS positions is not greater than the threshold, then the algorithm sets the value L to zero at box 116.

If the value L is greater than 1 and the distance between the GPS reports is significant enough at the decision diamond 114, then the algorithm determines whether the value S is greater than zero, whether the vehicle speed is slow and whether the GPS speed reports were the same or showed slowing from before the possible anomaly at decision diamond 118. If all of these criteria have been met, then the algorithm determines whether the value L+1 is greater than the value S at decision diamond 120, and if not, sets the value L equal to zero at box 122. If the value L+1 is greater than value S at the decision diamond 120, then the algorithm sets the value L equal to the value L+1 at box 124, then proceeds to set the value L equal to zero at the box 120.

If all of the criteria at the decision diamond 118 have not been met, then the algorithm determines again whether the distance between the last two GPS readings is significant enough at decision diamond 126 for the reasons discussed above. If the difference between the last two GPS reports is not significant enough at the decision diamond 126, the algorithm determines whether the distance between the GPS points $G_d$ and $G_m$ are significant enough at decision diamond 128, and if not, the process is done at box 130.

If the difference between the GPS locations $G_0$ and $G_{d-L}$ is significant at the decision diamond 126, then the algorithm records the GPS location $G_{d-L}$ as significant at box 132. Each of the records of $G_i$ as being significant means that the designated GPS report $G_i$ should be recorded as a location on the underlying road and map where the speed change is important in constructing segments of roads that display reasonably constant speeds. Typically these are either the point where the stop or change was first noticed, the point currently being examined or both if the distance between these two points is significant.

The algorithm then determines again whether the GPS points $G_d$ and $G_m$ are significant at decision diamond 134, and if not, the process is done at box 136 which indicates that after identifying one or more significant points, the same process needs to be performed over the range or ranges of GPS observations listed. This may be accomplished using any standard processing techniques, such as restarting the whole process with a new start point or using recurrision. Once a point has been recorded, it is regarded in the processes any other point previously designated as significant.

If either of the tests for significance at the decision diamonds 128 or 134 is yes, then the algorithm records the GPS location $G_d$ as being significant at box 138, and then reprocesses the points $G_{d-L}, \ldots, G_d$, and $G_d, \ldots, G_m$ at box 140.

If the algorithm determines that the value W is not less than 2 at the decision diamond 102, then the algorithm proceeds to determining whether the speed $G_d p$ is not slow and whether S is greater than zero at decision diamond 142. Further, the algorithm proceeds to this test from boxes 110, 112, 116 and 122. If the algorithm determines that the speed $G_d p$ is slow or the value S is zero at the decision diamond 142, the algorithm increments the value d at box 144, and determines whether the value d is equal to the value m at decision diamond 146. If the value d is equal to the value m at the decision diamond 146, then the algorithm is done at box 148, otherwise the algorithm returns to the beginning of the process to process the remaining GPS points at the box 96.

If the vehicle speed is not slow and the value S is greater than zero at the decision diamond 142, then the algorithm determines whether the value L is greater than zero at decision diamond 150. If the value L is greater than zero at the decision diamond 150, the algorithm then determines whether the value L is less than or equal to the value S at decision diamond 152, and if so, sets the value L equal to the value S+1 at box 154 and sets the value S equal to zero at box 156. If the value S is not less than or equal to the value S at the decision diamond 152, then the algorithm proceeds directly to set the value S equal to zero at the box 156, and then proceeds to the box 144 to increment the value d.

If the value L is not greater than zero at the decision diamond 150, then the algorithm determines whether the difference between the GPS locations $G_{d-S}$ and $G_d$ is significant in the same manner as discussed above, and if not, proceeds to the box 156 to set the value S to zero. If the difference between the GPS locations $G_{d-S}$ and $G_d$ is significant at the decision diamond 158, the algorithm determines whether the GPS locations $G_{d-S}$ and $G_0$ are significant at decision diamond 160. If the GPS locations $G_{d-S}$ and $G_0$ are not significant, then the algorithm determines whether the difference between the GPS locations $G_m$ and $G_d$ are significant at decision diamond 162, and if not, sets the value S equal to zero at the box 156.

If the algorithm determines that the difference in the GPS locations between $G_{d-S}$ and $G_0$ is significant at the decision diamond 160, the algorithm records the GPS location $G_{d-S}$ as significant at box 164, and then determines whether the difference between the GPS locations $G_m$ and $G_d$ are significant at box 166. If the difference between the GPS locations $G_m$ and $G_d$ is significant at the decision diamond 166, the algorithm records the GPS location $G_{d-S}$ as significant at box 168, and reprocesses the GPS locations $G_{d-S}, \ldots, G_d$ and $G_d, \ldots, G_m$ at box 170. If the difference between the GPS location $G_m$ and $G_d$ are not significant at the decision diamond 166, the algorithm is finished and reprocesses the GPS locations $G_{d-S}, \ldots, G_m$ at box 172. If the difference between the GPS locations $G_m$ and $G_d$ is significant at the decision diamond 162, the algorithm records the GPS location $G_d$ as significant at box 174, and reprocesses the GPS sequence $G_d, \ldots, G_m$ at box 176.

Some applications compile road segment statistics by matching segments from each trip with a database of prior travel segments. For example, the system and method described in the '721 application keeps track of the mean travel time and standard error on each map segment at various times of day. When a segment is split at a point recorded as significant in the process just described because of a significant speed change, the corresponding segment in the database should be split in turn and the aggregate statistics get divided between the new sub-segments that replace it. Because no abrupt changes in speed had been previously observed, the statistics may be divided based on the assumption that the speed along the segment was uniform in prior observations. In some applications, the statistics are estimates of time to travel from one end of the segment to the other. For this and similar quantities that depend directly on the distance traveled, the mean and standard deviation must be scaled when a segment is divided. After the split, the sample count for any statistics in each sub-segment is the same as for the original segment, but the mean, or sum of values, is scaled proportional by the length of the sub-segment divided by the full segment length. The standard deviation is scaled in the same way. Alternatively, the sum of squares often used to calculate standard deviation is scaled by the square of this fraction. After splitting the database segment, the replacement sub-segments are added to the statistical database in place of the divided segment. Since speeds differ in these new sub-segments, these statistics will begin to reflect more localized variations.

Additional refinements are possible. Observed changes in speed in a series of GPS reports may result from static features, such as yield signs, dynamic elements, such as signals, or unusual events, such as an accident. Static features may show little effect in light traffic and signals are inherently intermittent. In either case, the affects are likely to become evident within dozens of trips passing the feature. In the case of atypical events, such as accidents, it would be useful to occasionally scan the database for adjacent segments with nearly identical statistical properties and recombine them the remove transient artifacts. Alternatively, when a statistical group is already quite large, inserting new points might be deferred until there have been numerous similar events. This could be expected to happen as roads and signage change, resulting in altered traffic patterns.

The techniques described above provide reorganizing the map database and associated statistical history result in a database that effectively models the affect on traffic of many features, such as roadway design, implementation and traffic. A change in the number of lanes can be modeled by one or two new segments that represent the zone where traffic redistributes among the available lanes. In practice, such transitions display a somewhat variable length and a higher variation of observed speeds than the areas away from the change. In addition, the same volume of traffic will often move at a different speed in a different number of lanes.

When approaching stop signs and yield signs, there will be a typically short zone where speed is much slower, or even stop briefly, than elsewhere. In a few cases, the segments affected will extend much further, such as when crossing a busy road that does not stop. In either case, there will be a new segment where traffic suddenly slows and possible additional segments depending on the distance from the stop sign where traffic sees some effects.

For traffic signal, the result is a pattern of split segments similar to those approaching a stop sign. The affected region tends to be longer because of the time scale of the red phase that stops cars. The variability will also be higher because green lights will barely affect some traffic.

Many parking lot entrances and exits are not shown on maps and frequently are located between intersections. The flow of traffic is affected both by the changing volume of traffic as cars enter or leave the roadway and by the slowing and acceleration of cars making the transition between the street and the lot. Most crosswalks are associated with intersections, but some are not. When located elsewhere, pedestrian crosswalks will still affect traffic in ways similar to a signal or a yield sign.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for constructing and revising road maps in a database for a vehicle, said method comprising:
    identifying vehicle travel segments of the vehicle as a series of exemplar points using signals from a system that provides vehicle position;
    eliminating intermediate exemplar points in each travel segment to define the travel segment by a beginning exemplar point and an ending exemplar point of the travel segment;
    storing the travel segments in the database;
    identifying a travel time associated with each stored travel segment;
    comparing new vehicle travel segments to the stored vehicle travel segments to identify matches between the new travel segments and the stored travel segments, and wherein comparing new vehicle travel segments to the stored vehicle travel segments includes projecting points on the new travel segment to the stored travel segment using a line perpendicular to the stored travel segment;
    replacing a potential ending exemplar point of a travel segment with a new ending exemplar point if the potential ending point causes an average distance between the exemplar points identifying the travel segment and a straight line between the beginning exemplar point and the potential ending exemplar point to be greater than a threshold distance; and
    revising the travel time of a stored travel segment if a new travel segment does match a stored travel segment.

2. The method according to claim 1 wherein comparing new vehicle travel segments to the stored vehicle travel segments includes comparing and matching new travel segments to stored travel segments where a new travel segment is shorter than a stored travel segment and has different end points, or the stored travel segment is shorter than a new travel segment and has different end points.

3. The method according to claim 1 wherein comparing new travel segments to the stored travel segments includes projecting points on the new travel segment to the stored travel segment that are within a predetermined distance of the stored travel segment.

4. The method according to claim 1 further comprising identifying locations in the stored vehicle travel segments that define travel speeds where the flow of traffic changes.

5. The method according to claim 4 wherein the location where the flow of traffic changes identify a traffic signal location.

6. The method according to claim 4 wherein identifying locations where the flow of traffic changes include using the exemplar points in the travel segment to identify how fast the vehicle is traveling.

7. The method according to claim 1 wherein the system that provides the vehicle location signals is a GPS system.

8. The method according to claim 1 wherein the beginning exemplar point is a location where the vehicle is turned on or determined from a vehicle stay at a fixed point for a predetermined period of time.

9. A method for construction and revising road maps in a database for a vehicle, said method comprising:
    identifying vehicle travel segments of the vehicle as a series of exemplar points using signals from a system that provides vehicle position;
    eliminating intermediate exemplar points in each travel segment to define the travel segment by a beginning exemplar point and an ending exemplar point of the travel segment;
    replacing a potential ending exemplar point of a travel segment with a new ending exemplar point if the potential ending point causes an average distance between the exemplar points identifying the travel segment and a straight line between the beginning exemplar points and the potential ending exemplar point to be greater than a threshold distance;
    storing the travel segments in the database;
    comparing new vehicle travel segments to the stored vehicle travel segments to identify matches between the new travel segments and the stored travel segments; and
    revising statistical data associated with the stored vehicle travel segment if a new travel segment is found to match a stored travel segment.

10. The method according to claim 9 wherein comparing new vehicle travel segments to the stored vehicle travel segments includes comparing travel segments that only partially overlap.

11. The method according to claim 9 wherein comparing new vehicle travel segments to the stored vehicle travel segments includes comparing and matching new travel segments to stored travel segments where a new travel segment is shorter than a stored travel segment and has different end points, or the stored travel segment is shorter than a new travel segment and has different end points.

12. The method according to claim 9 wherein comparing new vehicle travel segments to the stored vehicle travel segments includes projecting points on the new travel segment to the stored travel segment using a line perpendicular to the stored travel segment.

13. The method according to claim 12 wherein comparing new travel segments to the stored travel segments includes projecting points on the new travel segment to the stored travel segment that are within a predetermined distance of the stored travel segment.

14. The method according to claim 12 wherein comparing new vehicle travel segments to the stored vehicle travel segments includes projecting a point from the new vehicle travel segment to the stored travel segment that identifies a curve or bend in the travel segment.

15. The method according to claim 9 wherein the system that provides the vehicle location signals is a GPS system.

16. The method according to claim 9 wherein the beginning exemplar point is a location where the vehicle is turned on or determined from a vehicle stay at a fixed point for a predetermined period of time.

17. The method according to claim 1 wherein comparing new vehicle travel segments to the stored vehicle travel segments includes comparing travel segments that only partially overlap.

\* \* \* \* \*